US009032208B2

(12) United States Patent
Tsuji et al.

(10) Patent No.: US 9,032,208 B2
(45) Date of Patent: May 12, 2015

(54) COMMUNICATION TERMINAL, COMMUNICATION SYSTEM, COMMUNICATION METHOD AND COMMUNICATION PROGRAM

(75) Inventors: Hirosato Tsuji, Tokyo (JP); Yoichi Shibata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 55 days.

(21) Appl. No.: 13/814,836

(22) PCT Filed: Aug. 24, 2010

(86) PCT No.: PCT/JP2010/064237
§ 371 (c)(1),
(2), (4) Date: Feb. 7, 2013

(87) PCT Pub. No.: WO2012/025987
PCT Pub. Date: Mar. 1, 2012

(65) Prior Publication Data
US 2013/0138961 A1    May 30, 2013

(51) Int. Cl.
H04L 29/06    (2006.01)
H04L 9/08    (2006.01)
(Continued)

(52) U.S. Cl.
CPC .............. *H04L 9/08* (2013.01); *H04L 9/0656* (2013.01); *H04L 2209/80* (2013.01); *H04W 12/02* (2013.01)

(58) Field of Classification Search
CPC ..... H04L 9/08; H04L 9/0656; H04L 2209/80; H04W 12/02
USPC ............... 380/277–279, 283, 44, 46–47, 255, 380/259–260; 713/168, 171
See application file for complete search history.

(56) References Cited

U.S. PATENT DOCUMENTS 1,310,719 A    7/1919    Vernam
7,177,424 B1    2/2007    Furuya et al.
(Continued)

FOREIGN PATENT DOCUMENTS

CN    101207628 A    6/2008
JP    2001 7800    1/2001
(Continued)

OTHER PUBLICATIONS

Office Action issued on Jan. 14, 2014, in Japanese Patent Application No. 2012-530455 with partial English translation.
(Continued)

Primary Examiner — Yin-Chen Shaw
Assistant Examiner — John B King
(74) Attorney, Agent, or Firm — Oblon, McClelland, Maier & Neustadt, L.L.P.

(57) ABSTRACT

A communication terminal that can adjust which section of a one-time pad cipher key is used and achieve cipher communication when there is a possibility that the one-time pad cipher keys are not completely matched between communication terminals. A cipher key transfer device acquires a one-time pad cipher key from a key sharing system, divides the acquired one-time pad cipher key with a predetermined number of bits, and transfers the same to a mobile communication terminal after converting the same into one-time pad cipher key cartridges. Along with the partner's terminal, the mobile communication terminal negotiates which one-time pad cipher key cartridge will be used to perform cipher communication, decides the one-time pad cipher key cartridge to be used, and begins cipher communication.

15 Claims, 12 Drawing Sheets

(51) Int. Cl.
*H04L 9/06* (2006.01)
*H04W 12/02* (2009.01)

(56) References Cited

U.S. PATENT DOCUMENTS

| | | |
|---|---|---|
| 2001/0021253 A1 | 9/2001 | Furuya et al. |
| 2001/0021254 A1 | 9/2001 | Furuya et al. |
| 2004/0128563 A1* | 7/2004 | Kaushik et al. ............... 713/300 |
| 2006/0259769 A1* | 11/2006 | Goettfert et al. ............. 713/168 |
| 2007/0064944 A1 | 3/2007 | Furuya et al. |
| 2008/0147820 A1 | 6/2008 | Maeda et al. |
| 2010/0290627 A1 | 11/2010 | Tsuji et al. |
| 2011/0305337 A1* | 12/2011 | Devol et al. .................. 380/259 |

FOREIGN PATENT DOCUMENTS

| | | |
|---|---|---|
| JP | 2001 86110 | 3/2001 |
| JP | 2005 27358 | 1/2005 |
| JP | 2005 318281 | 11/2005 |
| JP | 2008 154019 | 7/2008 |

OTHER PUBLICATIONS

International Search Report Issued Sep. 21, 2010 in PCT/JP10/64237 Filed Aug. 24, 2010.

Office Action Issued Nov. 28, 2014 in Chinese Patent Application No. 201080068705.7 (with English translation).

* cited by examiner

Fig. 7 SEQUENCE DIAGRAM WHILE MOBILE COMMUNICATION TERMINALS 103 ARE IMPLEMENTING CIPHER COMMUNICATION

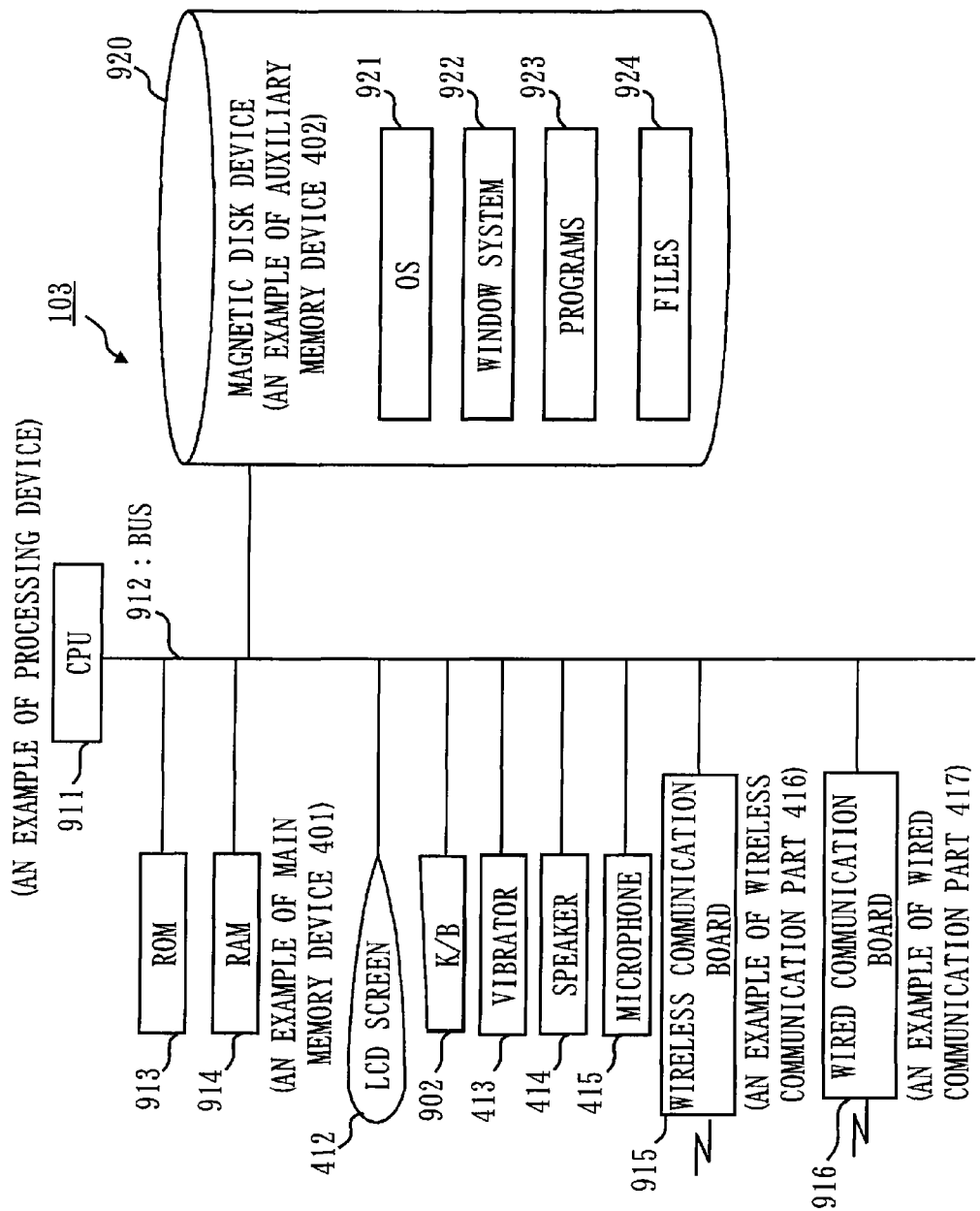

COMMUNICATION TERMINAL, COMMUNICATION SYSTEM, COMMUNICATION METHOD AND COMMUNICATION PROGRAM

TECHNICAL FIELD

The present invention relates to cipher communication technique using a one-time pad (OTP: One-Time Pad) cipher.

BACKGROUND ART

Among a plurality of communication terminals, a key of cipher algorithm is shared to encrypt communication contents between the communication terminals, thereby preventing eavesdropping of the communication contents.

At this time, when a block cipher algorithm is used as a cipher algorithm, plaintext data is divided into units (usually having a fixed length) called blocks, and encrypting process using a cipher key is repeatedly done for each block.

Further, when a stream cipher algorithm is used as the cipher algorithm, a pseudo random number called key stream is generated from the cipher key, and encrypting process of plaintext data using the key stream is repeatedly done for each bit.

In either case, the length of the cipher key shared between the communication terminals is 128 bits or 256 bits, and so on. Namely, it is a system to encrypt the communication contents based on the cipher key being shorter than the plaintext data. In these systems, a range of possible values of the cipher key is 128 to 256 powers of 2 types of combinations, and thus it is considered impossible to do brute-force attack for decrypting using all the combinations of the cipher keys if the current computer technology is employed.

On the other hand, there is another cryptosystem called OTP, in which a random number having the same length as the plaintext data is prepared and the random number is used as a key for one-time encryption.

In the OTP cipher system, the range of possible values of the cipher key is a huge space which is the same as the plaintext data, and thus it is provable that the decrypting is impossible even if computer technology is tremendously progressed. Varnam's Cipher is one type of the OTP cipher system, in which an exclusive logical sum (XOR) of the plaintext data and the cipher key is used as cipher text.

In order to encrypt the communication contents using the OTP cipher system, it is necessary to previously share the OTP cipher key being longer than or equal to the plaintext data between the communication terminals. The quantum key distribution (QKD: Quantum Key Distribution) technique is considered to be an effective technique to share the OTP cipher key.

CITATION LIST

Patent Literature

Patent Literature 1: JP2001-7800A
Patent Literature 2: JP2001-86110A

SUMMARY OF INVENTION

Brief Summary of Invention

In the communication system using the OTP cipher system, it is necessary to adjust which part of the previously shared long OTP cipher key should be used for encryption between the communication terminals trying to carry out cipher communication using the OTP cipher.

Conventionally, it is a premise that the communication terminal in the communication system using the OTP cipher system is a fixed terminal which is always connected to the key sharing system using the quantum key distribution technique and so on. Therefore, the OTP cipher keys are assumed to be completely matched between the communication terminals, and the OTP cipher keys can be simply used sequentially from the initial bit for the encryption.

However, when the communication terminal is, for example a mobile communication terminal, the communication terminal is connected to the key sharing system irregularly, and thus the OTP cipher keys may not be completely matched between the mobile communication terminals. Further, another case can be considered, in which the connection of the mobile communication terminal may be released during the OTP cipher key is transferred to the mobile communication terminal, and a part of the OTP cipher key may be failed to be transferred. Because of these reasons, the OTP cipher keys may not be completely matched between the mobile communication terminals.

The present invention aims to implement the cipher communication by adjusting which part of the OTP cipher key should be used when the OTP cipher keys may not be completely matched between the communication terminals.

According to the present invention, a communication terminal includes:

a cipher key block storage part which stores a cipher key for one-time pad cipher as a plurality of cipher key blocks generated by dividing the cipher key with a predetermined number of bits;

an identifying information transmission part which transmits first identifying information that specifies the plurality of cipher key blocks stored by the cipher key block storage part to a partner's terminal of communication;

an identifying information reception part which receives from the communication partner second identifying information that specifies only cipher key blocks included in cipher key blocks retained by the partner's terminal among the plurality of cipher key blocks specified by the first identifying information transmitted by the identifying information transmission part; and a cipher communication part which performs cipher communication with the partner's terminal by a one-time pad cipher using the cipher key blocks specified by the second identifying information received by the identifying information reception part.

In the communication terminal according to the present invention, the cipher key for the OTP cipher is stored as a cipher key block generated by dividing the key with a predetermined number of bits, after confirming the cipher key block which is shared with the communication partner prior to the cipher communication, the cipher key block to be used for the cipher communication is decided. By this operation, it is possible to adjust which part of the OTP cipher key should be used.

BRIEF DESCRIPTION OF DRAWINGS

FIG. 12 shows an example of hardware configuration of the mobile communication terminal 103.

DESCRIPTION OF EMBODIMENTS

Hereinafter, embodiments of the present invention will be explained with reference to the drawings.

In the following description, the processing device is a CPU 911 to be described later, and the like. A non-volatile memory is a magnetic disk device 920 to be described later, and the like. Further, a volatile memory is a RAM 914 to be described later, and the like.

Embodiment 1

Figure 1:
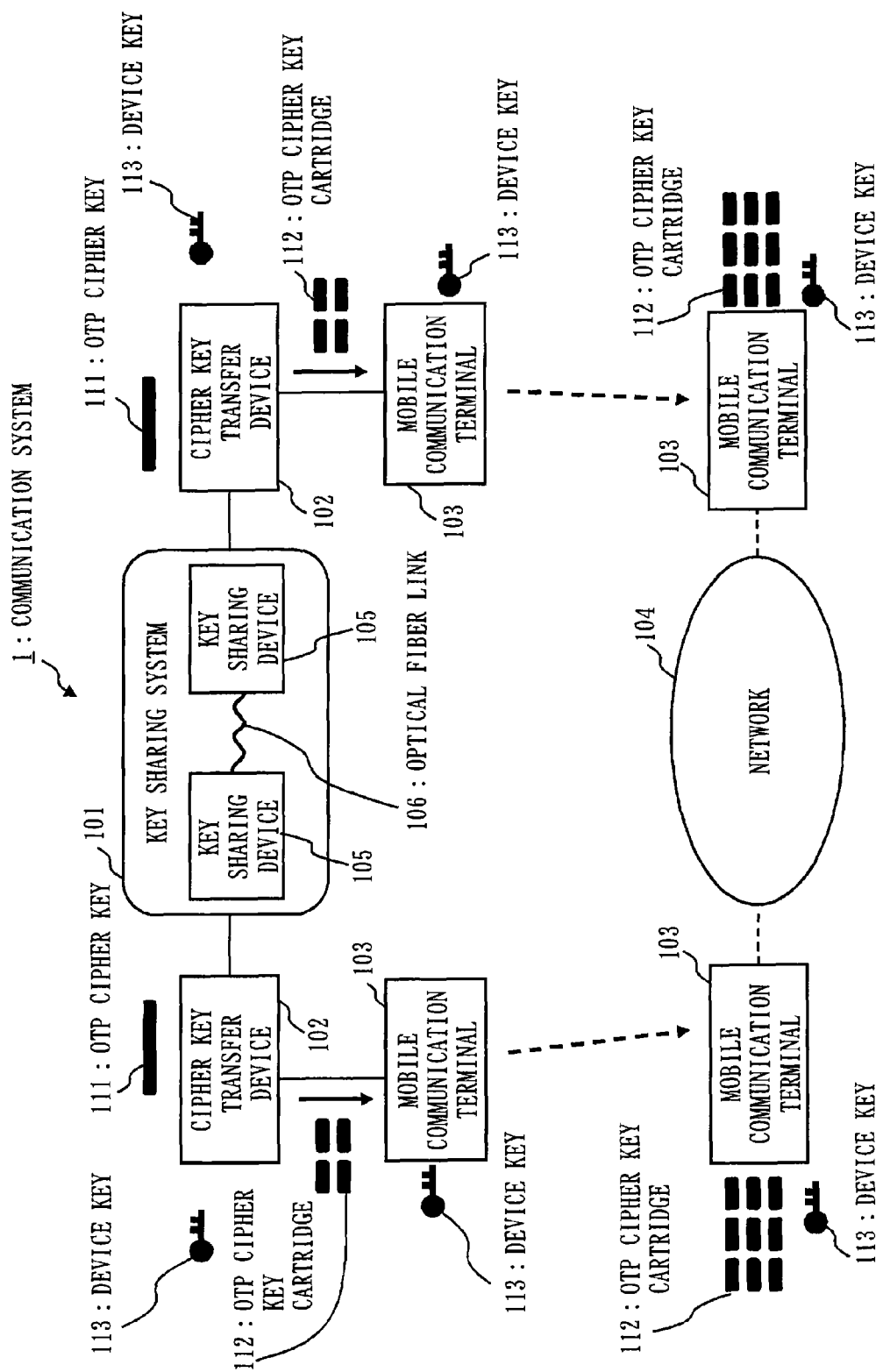
FIG. 1 is a configurational diagram showing a communication system 1 according to the first embodiment.

FIG. 1 is a configurational diagram showing communication system 1 according to the first embodiment.

The communication system 1 includes a key sharing system 101, a plurality of cipher key transfer devices 102, a plurality of mobile communication terminals 103, and a network 104.

The key sharing system 101 provides means to share an OTP cipher key 111 between hubs. Here, the key sharing system 101 is assumed to be a system using a quantum cipher key distribution technique; however, the system also can employ another method.

The key sharing system 101 includes a key sharing device 105 at each hub, and the key sharing devices 105 are connected by an optical fiber link 106. Then, between the key sharing devices 105, an OTP cipher key 111 having, for example, 20,000 bits per second is shared via the optical fiber link 106.

The cipher key transfer device 102 transfers the OTP cipher key 111 shared by the key sharing system 101 to a mobile communication terminal 103.

The cipher key transfer device 102 is provided at each hub and is connected to the key sharing device 105 provided at that hub. The cipher key transfer device 102 acquires the OTP cipher key 111 from the key sharing device 105 connected thereto. Then, the cipher key transfer device 102 divides the acquired OTP cipher key 111, encrypts using a device key 113 to convert to a format of an OPT cipher key cartridge 112, and transfers to the mobile communication terminal 103.

The mobile communication terminal 103 performs cipher communication with another mobile communication terminal 103 via a network 104 using the OTP cipher key cartridge 112 transferred from the cipher key transfer device 102.

For example, the mobile communication terminal 103 encrypts call data (voice data) using the OTP cipher key cartridge 112, thereby communicating with another communication terminal 103.

The network 104 is used for a communication passage between the mobile communication terminals 103.

The OTP cipher key 111 is a cipher key for OTP shared between hubs in the key sharing system 101; the OTP cipher key 111 is, for example a true random number. Since 20,000 bits per second of the OTP cipher key 111 are shared between the key sharing devices 105 as discussed above, the OTP cipher key 111 becomes data with an extremely large bit string.

The OTP cipher key cartridge 112 is a cipher key for OTP generated by dividing the OTP cipher key 111 with amount of bits required for cipher communication of a certain amount of communication data, and encrypting using the device key 113.

For example, the OTP cipher key cartridge 112 is, in case of the communication with encrypting the call data, a cipher key for OTP encryption which can encrypt the call data of a predetermined time length (10 minutes, for example). In this case, if a bit rate of the call data is 8000 bps (bit per second), the OTP cipher key cartridge 112 is 8000 bps×600 seconds (10 minutes)×2=9,600,000 bits. Here, the final duplation in the above equation is because the call is bi-directional communication.

The device key 113 is a key previously shared between the cipher key transfer device 102 and the mobile communication terminal 103. The device key 113 is used for encrypting the OTP cipher key cartridge 112.

Next, function of the cipher key transfer device 102 according to the first embodiment will be explained.

Figure 2:
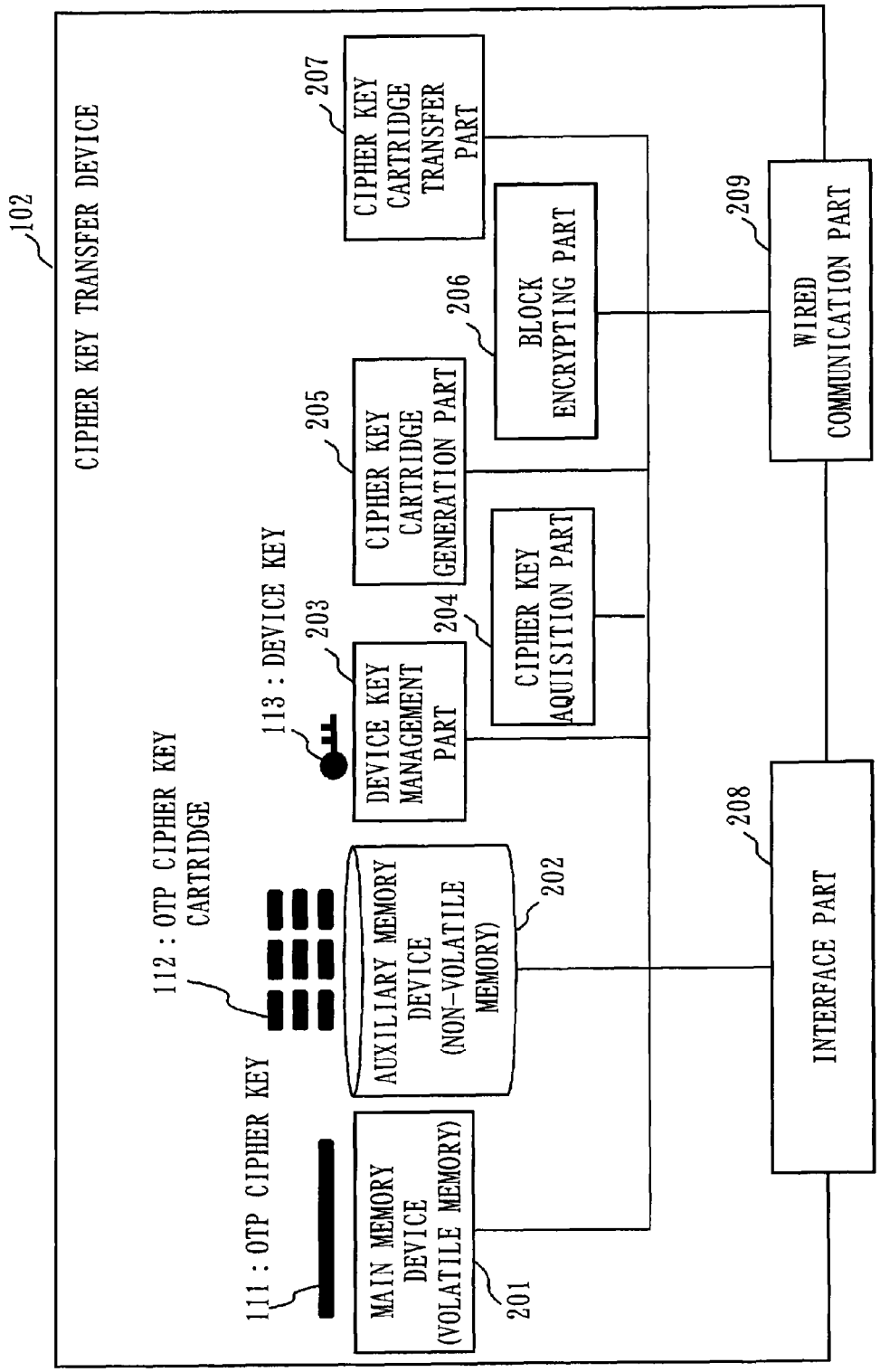
FIG. 2 is a block diagram showing function of a cipher key transfer device 102 according to the first embodiment.

FIG. 2 is a block diagram showing function of the cipher key transfer device 102 according to the first embodiment.

The cipher key transfer device 102 includes a main memory device 201, an auxiliary memory device 202, a device key management part 203, a cipher key acquisition part 204, a cipher key cartridge generation part 205 (a cipher key block generation part), a block encrypting part 206, a cipher key cartridge transfer part 207, an interface part 208, and a wired communication part 209.

The main memory device 201 is a volatile memory which is capable of retaining data only while electric power is supplied to the cipher key transfer device 102. The auxiliary memory device 202 is a non-volatile memory which is capable of retaining data regardless whether electric power is supplied to the cipher key transfer device 102 or not. The device key management part 203 manages the device key 113 which is the key previously shared with the mobile communication terminal 103 by a tamper resistant device and so on.

The interface part 208 is an interface to connect to the key sharing system 101. For example, the cipher key transfer device 102 is always connected to the key sharing system 101 via the interface part 208. The wired communication part 209 is an interface to connect to the mobile communication terminal 103. For example, the cipher key transfer device 102 is connected to the mobile communication terminal 103 via the wired communication part 209 irregularly.

The other functions will be described in detail in the explanation of the operation of the cipher key transfer device 102.

Next, the operation of the cipher key transfer device 102 will be explained.

First, the operation at the time of acquiring the OTP cipher key 111 will be explained.

The cipher key acquisition part 204 acquires the OTP cipher key 111 which has been shared between the key sharing devices 105 of the key sharing system 101 from the key sharing device 105 connected via the interface part 208 at every prescribed time period. The acquired OTP cipher key 111 is temporarily stored in the main memory device 201.

Next, the cipher key cartridge generation part 205 divides the OTP cipher key 111 using a processing device with amount of bits required for the cipher communication of a certain amount of communication data. Then, the cipher key cartridge generation part 205 makes the block encrypting part 206 encrypt each of the divided OTP cipher key 111 using the device key 113 managed by the device key management part 203. By the above operation, the cipher key cartridge generation part 205 generates a plurality of OTP cipher key cartridges 112. The generated OTP cipher key cartridge 112 is stored in the auxiliary memory device 202. After generating the OTP cipher key cartridge 112, the cipher key cartridge generation part 205 erases the OTP cipher key 111 from the main memory device 201.

Next, a detail of the process to convert the OTP cipher key 111 to the OTP cipher key cartridge 112 will be explained.

Figure 3:
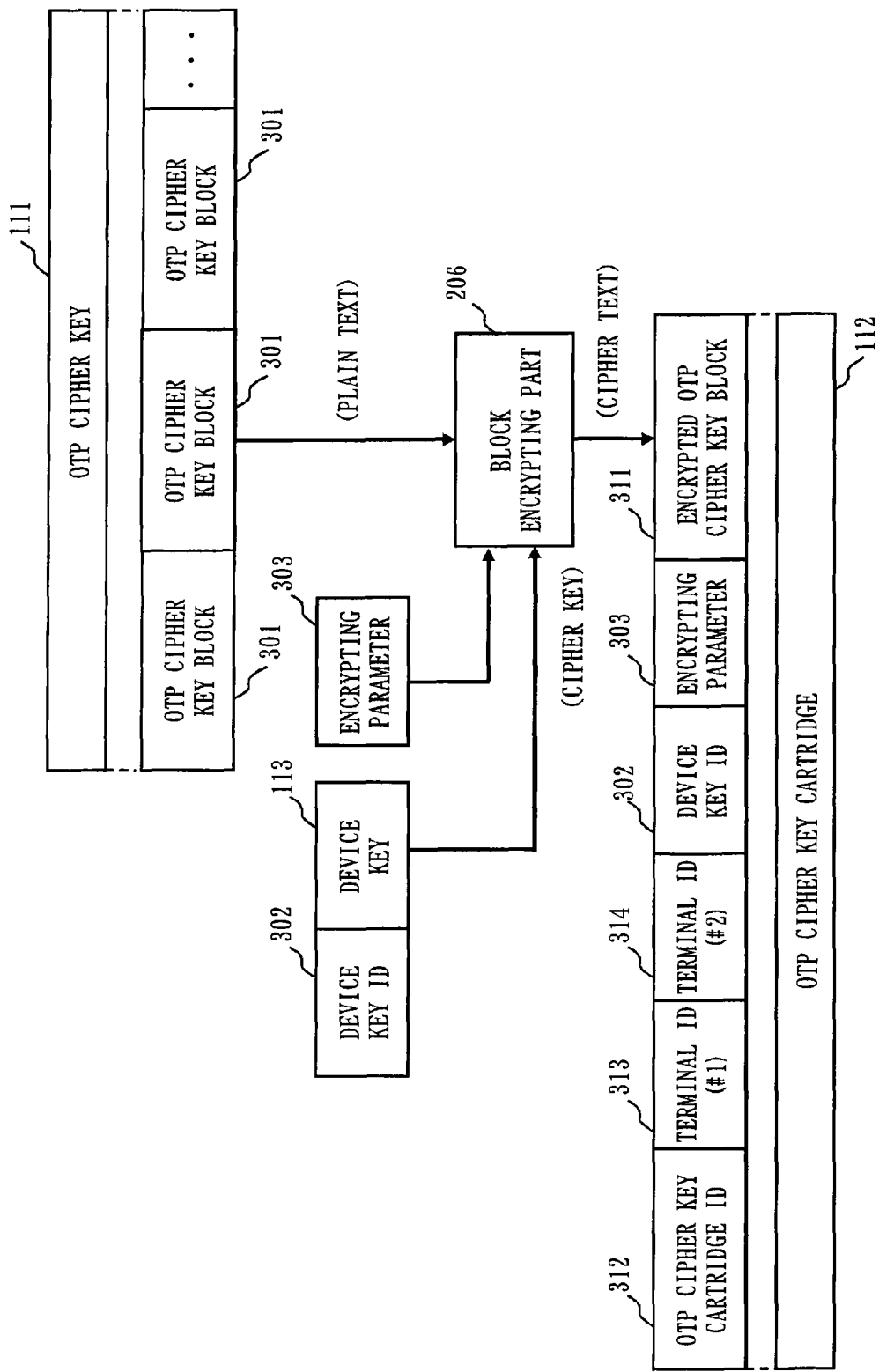
FIG. 3 is a diagram showing a format of an OTP cipher key cartridge 112 and a cartridging/encrypting process in the cipher key transfer device 102 according to the first embodiment.

FIG. 3 is a diagram showing a format of the OTP cipher key cartridge 112 and a cartridging/encrypting process in the cipher key transfer device 102 according to the first embodiment.

An OTP cipher key block 301 is a block generated by dividing the OTP cipher key 111 with amount of bits required for the cipher communication of a certain amount of communication data. A device key ID 302 is an identifier to uniquely identify the device key 113. An encrypting parameter 303 is an algorithm parameter (for example, specification of the encrypting mode or IV (Initialization Vector) value) specified when the encryption is done using the block cipher algorithm.

An encrypted OTP cipher key block 311 is a cipher text which has been encrypted by the block encrypting part 206 using the block cipher algorithm when one of the OTP cipher key blocks 301 is assumed as plain text, the device key 113 as the cipher key, and the encrypting parameter 303 as an algorithm parameter. An OTP cipher key cartridge ID 312 is an identifier to uniquely identify the OTP cipher key cartridge 112. A terminal ID (#1) 313 and a terminal ID (#2) 314 are identifiers to identify two mobile communication terminals which perform the cipher communication using the OTP cipher key cartridge 112.

The cipher key cartridge generation part 205 makes the block encrypting part 206 encrypt each OTP cipher key block 301 by the block cipher algorithm using the device key 113 and the encrypting parameter 303. By the above operation, the encrypted OTP cipher key block 311 is generated.

Then, the cipher key cartridge generation part 205 combines the OTP cipher key cartridge ID 312, the terminal ID (#1) 313, the terminal ID (#2) 314, the device key ID 302, the encrypting parameter 303 with the encrypted OTP cipher key block 311, thereby forming one OTP cipher key cartridge 112.

Next, the operation will be explained when the OTP cipher key cartridge 112 is transferred.

The cipher key cartridge transfer part 207 detects connection of the mobile communication terminal 103 via the wired communication part 209. Then, the cipher key cartridge transfer part 207 transfers the OTP cipher key cartridges 112 stored in the auxiliary memory device 202 to the mobile communication terminal 103 via the wired communication part 209. After confirming the normal transfer, the cipher key cartridge transfer part 207 erases the OTP cipher key cartridges 112 from the auxiliary memory device 202.

Here, between the key sharing devices 105, the same OTP cipher key 111 is always shared. Further, since the cipher key transfer device 102 is always connected to the key sharing device 105, the same OTP cipher key 111 is shared between the cipher key transfer devices 102 in principle.

However, the mobile communication terminal 103 is connected to the cipher key transfer device 102 irregularly and acquires the OTP cipher key cartridge 112 from the cipher key transfer device 102 at the timing of connection. Therefore, the OTP cipher key cartridges 112 retained are sometimes different between the mobile communication terminals 103.

Further, for example, during the OTP cipher key cartridge 112 is transferred from the cipher key transfer device 102 to the mobile communication terminal 103, a cable which connects the cipher key transfer device 102 and the mobile communication terminal 103 may be pulled out, and the connection may be released between the cipher key transfer device 102 and the mobile communication terminal 103. At this time, the transfer of some OTP cipher key cartridges 112 is failed, and those OTP cipher key cartridges 112 may not be transferred to the mobile communication terminal 103. This may cause a problem that the retained OTP cipher key cartridges 112 are different between the mobile communication terminals 103.

Next, the function of the mobile communication terminal 103 according to the first embodiment will be explained.

Figure 4:
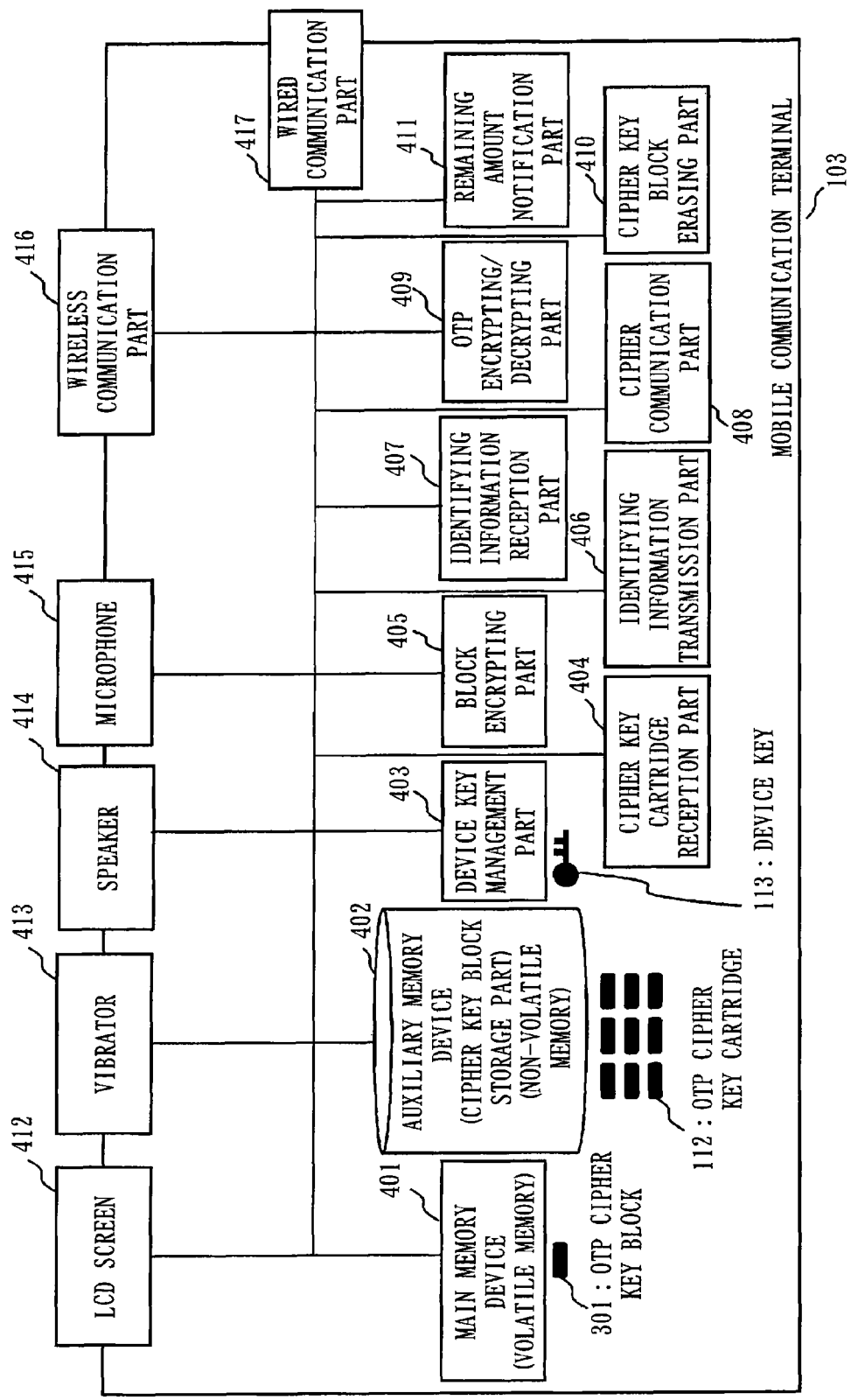
FIG. 4 is a block diagram showing function of a mobile communication terminal 103 according to the first embodiment.

FIG. 4 is a block diagram showing function of the mobile communication terminal 103 according to the first embodiment.

The mobile communication terminal 103 includes a main memory device 401, an auxiliary memory device 402 (a cipher key block storage part), a device key management part 403, a cipher key cartridge reception part 404, a block decrypting part 405, an identifying information transmission part 406, an identifying information reception part 407, a cipher communication part 408, an OPT encrypting/decrypting part 409, a cipher key block erasing part 410, a remaining amount notification part 411, a liquid crystal display screen 412, a vibrator 413, a speaker 414, a microphone 415, a wireless communication part 416, and a wired communication part 417.

The main memory device 401 is a volatile memory which is capable of retaining data only while electric power is supplied to the mobile communication terminal 103. The auxiliary memory device 402 is a non-volatile memory which is capable of retaining data regardless whether electric power is supplied to the mobile communication terminal 103 or not. The device key management part 403 manages the device key 113 which is the key previously shared with the cipher key transfer device 102.

The liquid crystal display screen 412 is a display device to output text information or graphic information. The vibrator 413 is a device to generate vibration. The speaker 414 is a device to output voice. The microphone 415 is a device to input voice.

The wireless communication part 416 is an interface to communicate with another mobile communication terminal 103 via the network 104. The wired communication part 417 is an interface to connect to the cipher key transfer device 102.

The other functions will be explained in detail in the explanation of the operation of the mobile communication terminal 103.

Next, the operation of the mobile communication terminal 103 will be explained.

First, the operation of the OTP cipher key cartridge 112 at the time of supplement.

The cipher key cartridge reception part 404 receives the OTP cipher key cartridge 112 transferred by the cipher key transfer device 102 via the wired communication part 417 and stores in the auxiliary memory device 402.

Next, the operation of cipher communication using the OTP cipher key cartridge 112 will be explained.

First, the cipher communication part 408, for encrypting the communication contents, extracts the OTP cipher key block 301 from the OTP cipher key cartridge 112 stored in the auxiliary memory device 402 and stores in the main memory device 401. After extracting the OTP cipher key block 301, the cipher key block erasing part 410 erases the OTP cipher key cartridge 112 from the auxiliary memory device 402.

Then, cipher communication part 408 carries out cipher communication with another mobile communication terminal 103 via the wireless communication part 416 using each bit of the OTP cipher key block 301 stored in the main memory device 401 sequentially from the initial bit. After the cipher communication is finished, the cipher key block erasing part 410 erases the OTP cipher key block 301 from the main memory device 401.

Next, a detail of an extracting process from the OTP cipher key cartridge 112 to the OTP cipher key block 301 (an opening process of the OTP cipher key cartridge 112) will be explained.

Figure 5:
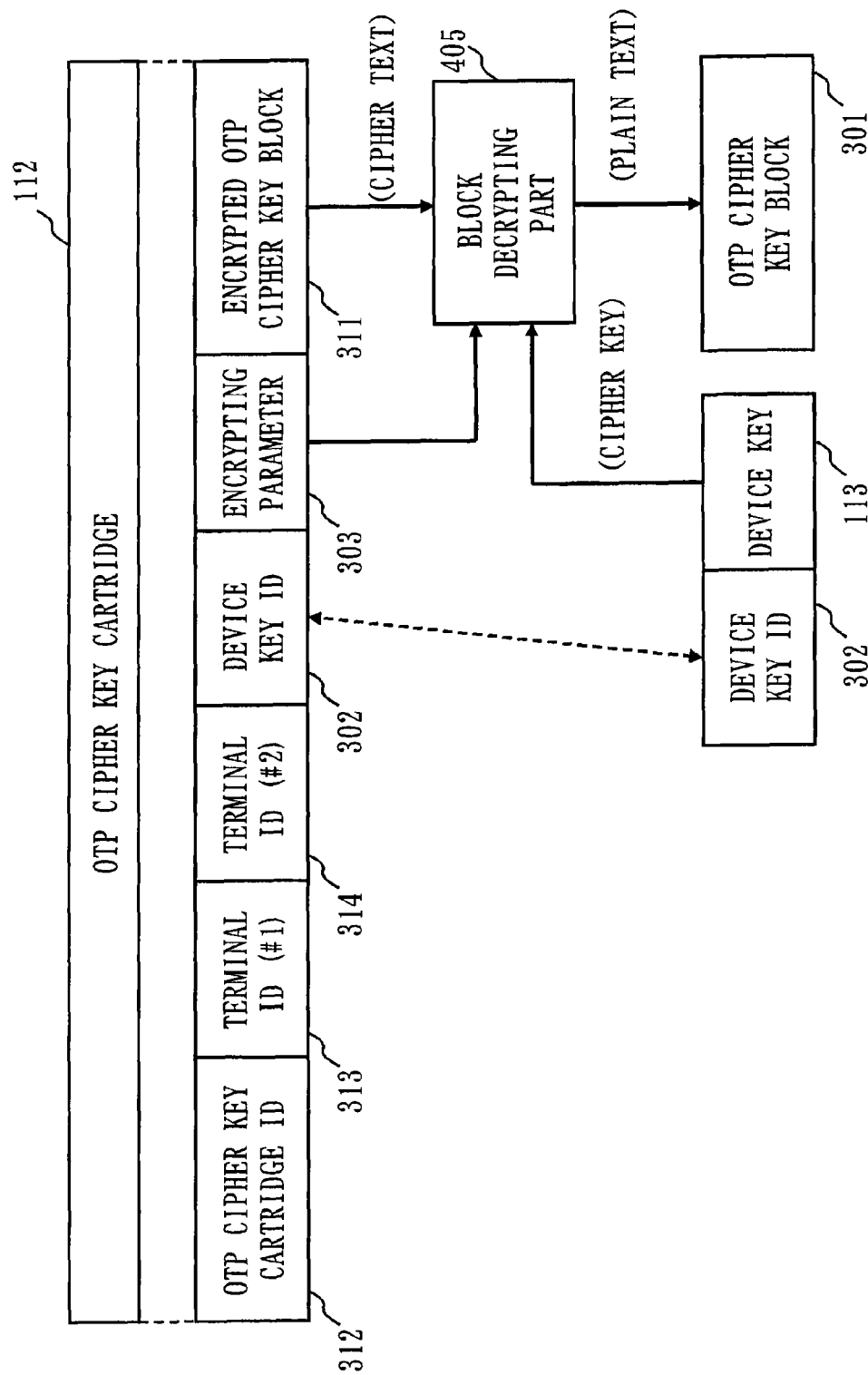
FIG. 5 is a diagram showing a format of the OTP cipher key cartridge 112 and an opening process of the mobile communication terminal 103 according to the first embodiment.

FIG. 5 is a diagram showing a format of the OTP cipher key cartridge 112 and an opening process in the mobile communication terminal 103 according to the first embodiment.

Here, in FIG. 5, the OTP cipher key cartridge 112 and its configurational components are the same as ones in FIG. 3.

The cipher communication part 408 confirms that the terminal ID (#1) 313 and the terminal ID (#2) 314 included in the OTP cipher key cartridge 112 are the terminal IDs of the self terminal and the mobile communication terminal 103 of the communication partner. Further, the cipher communication part 408 confirms that the device key ID 302 managed by the device key management part 403 matches the device key ID 302 included in the OTP cipher key cartridge 112.

When the above conditions are satisfied, the cipher communication part 408 makes the block decrypting part 405 decrypt the encrypted OTP cipher key block 311 included in the OTP cipher key cartridge 112. At this time, the block decrypting part 405 decrypts the encrypted OTP cipher key block 311 by the block cipher algorithm using the device key 113 managed by the device key management part 403 and the encrypting parameter 303 included in the OTP cipher key cartridge 112. By the above operation, the OTP cipher key block 301 is extracted.

Next, a method for adjusting the OTP cipher key cartridge 112 used for encrypting between the mobile communication terminals 103 and a method for erasing the used OTP cipher key cartridge 112 will be explained.

First, at the start of the cipher communication, negotiation for deciding the OTP cipher key cartridge 112 to be used between the mobile communication terminals 103 will be explained.

Figure 6:
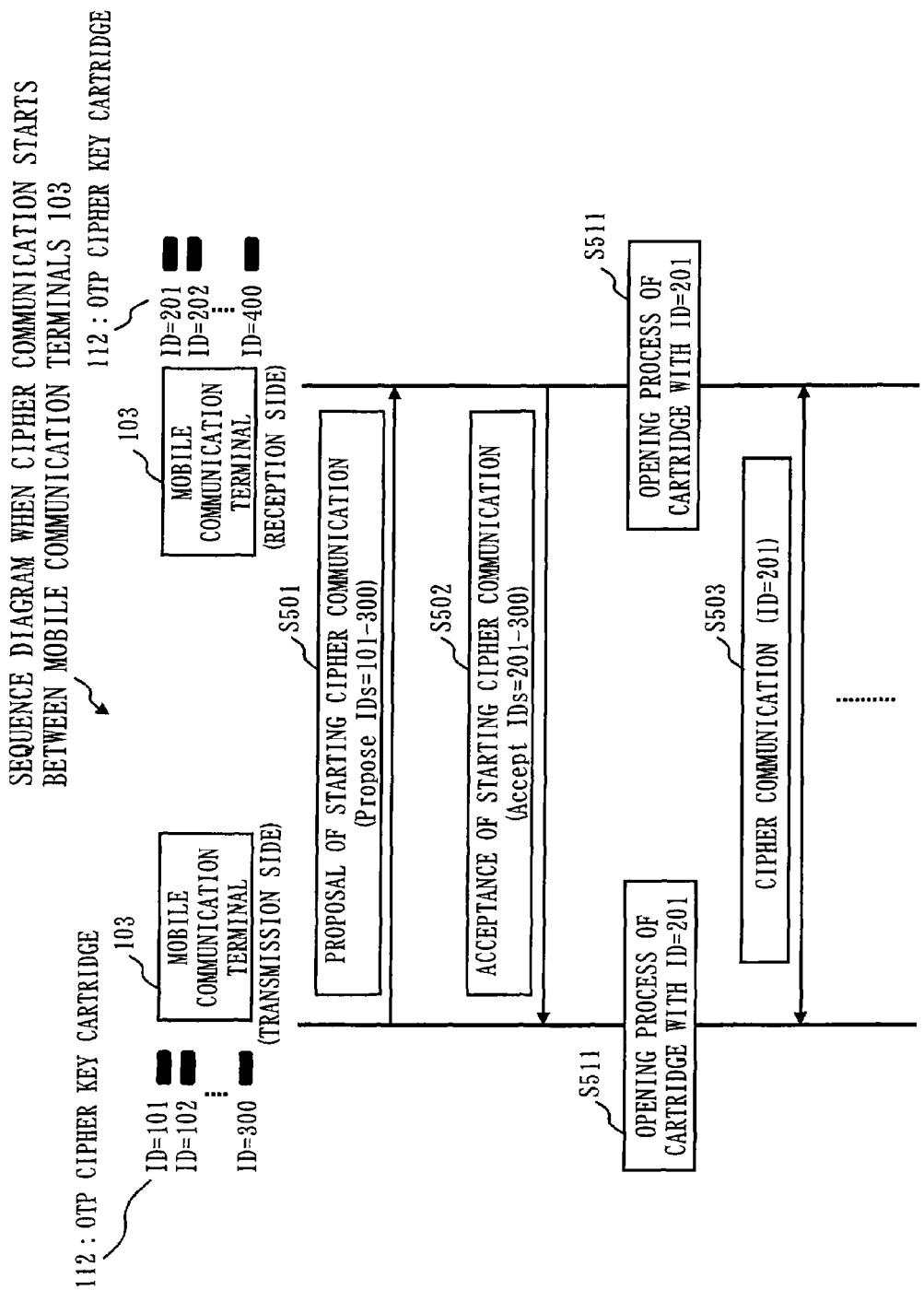
FIG. 6 is a sequence diagram when the mobile communication terminals 103 start cipher communication.

FIG. 6 is a sequence diagram when the mobile communication terminals 103 start cipher communication.

Here, at the start of the communication, the mobile communication terminal 103 of the transmission side has the OTP cipher key cartridges 112 with IDs=101 to 300. Further, the mobile communication terminal 103 of the reception side has the OTP cipher key cartridges 112 with IDs=201 to 400.

The identifying information transmission part 406 of the mobile communication terminal 103 of the transmission side transmits a proposal of cipher communication (Proposed IDs=101 to 300) (an example of the first identifying information) showing that the mobile communication terminal 103 has the OTP cipher key cartridges 112 with IDs=101 to 300 to the mobile communication terminal 103 of the reception side (S501).

The identifying information reception part 407 of the mobile communication terminal 103 of the reception side receives the proposal of cipher communication (Proposed IDs=101 to 300). Then, the cipher communication part 408 compares using the processing device the IDs (=101 to 300) shown by the received proposal of cipher communication with the IDs (201 to 400) of the OTP cipher key cartridge 112 retained by the mobile communication terminal 103 of the reception side. By this operation, the cipher communication part 408 identifies IDs of the OTP cipher key cartridges 112 shared by both mobile communication terminals 103 of the transmission side and the reception side. Here, both mobile communication terminals 103 share the OTP cipher key cartridges 112 with IDs=201 to 300. Then, the identifying information transmission part 406 of the mobile communication terminal 103 at the reception side transmits an acceptance of starting cipher communication (Accept IDs=201-300) (an example of the second identifying information) showing that both mobile communication terminals 103 share the OTP cipher key cartridges 112 with IDs=201 to 300 to the mobile communication terminal 103 of the transmission side (S502).

The identifying information reception part 407 of the mobile communication terminal 103 at the transmission side receives the acceptance of starting cipher communication (Accept IDs=201-300). By the above operation, both mobile communication terminals 103 know IDs of the OTP cipher key cartridges 112 shared by both mobile communication terminals 103.

Then, cipher communication parts 408 of both of the mobile communication terminal 103 decide the OTP cipher key cartridges 112 to be used from IDs of the OTP cipher key cartridges 112 shared by both mobile communication terminals 103 by a method which has been previously shared using the processing device. For example, the cipher communication parts 408 select ID having the least value. Here, ID=201 is selected. Then, the cipher communication parts 408 of both mobile communication terminals 103 carry out the opening process (refer to FIG. 5) of the OTP cipher key cartridge 112 with ID=201 (S511).

Thereafter, the cipher communication parts 408 of both mobile communication terminals 103 make the OTP encrypting/decrypting parts 409 encrypt the communication data using the OTP cipher key block 301 of the OTP cipher key cartridge 112 with ID=201 sequentially from the front bit. Then, the cipher communication parts 408 of both mobile communication terminals 103 carry out cipher communication by transmitting/receiving the encrypted communication data (S503). Here, the communication data is, for example, call data input from the microphone 415.

Next, the operation will be explained when the cipher communication continues exceeding the communication data amount of one piece of the OTP cipher key cartridge 112 and the OTP cipher key cartridge 112 has been exhausted.

Figure 7:
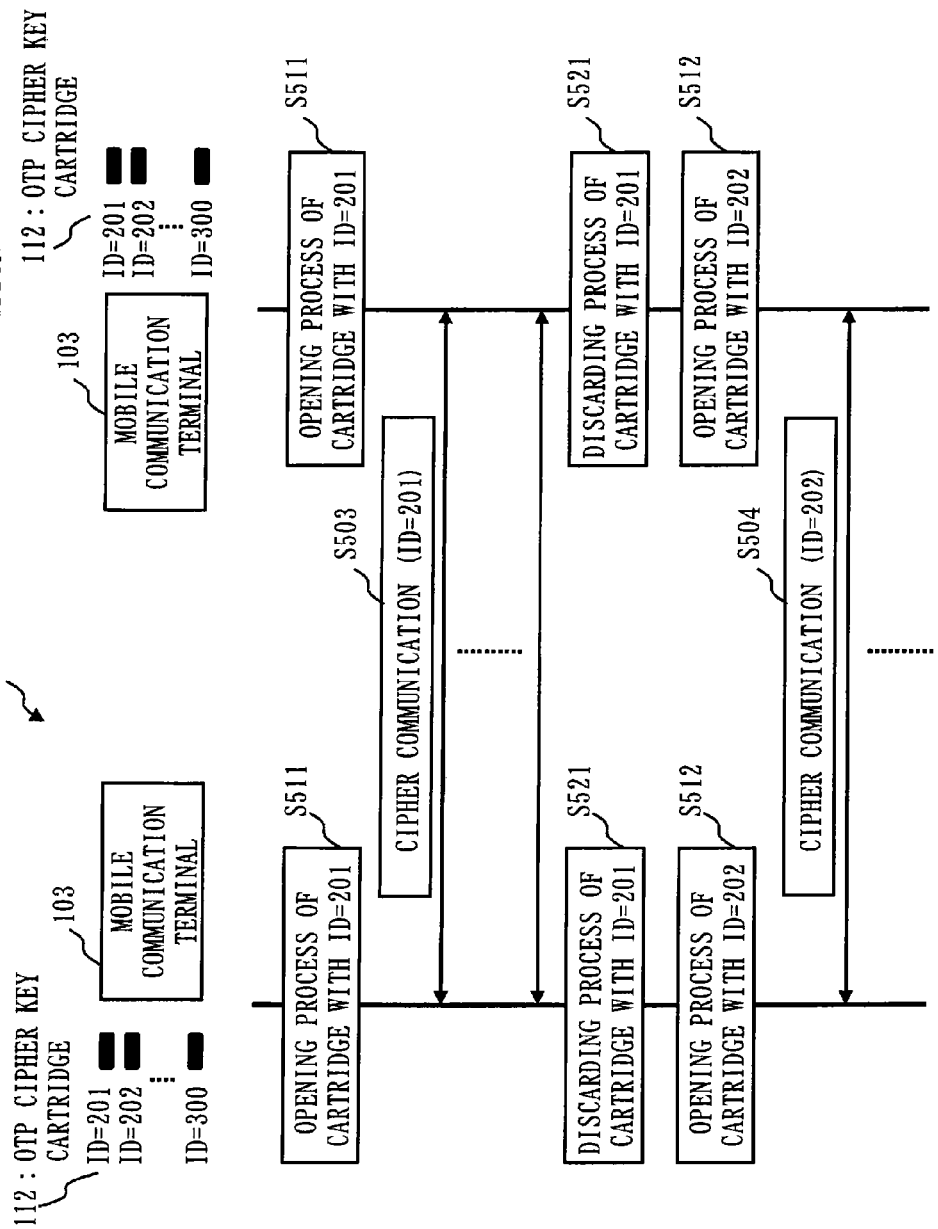
FIG. 7 is a sequence diagram while the mobile communication terminals 103 are implementing cipher communication.

FIG. 7 is a sequence diagram while the mobile communication terminals 103 are implementing cipher communication.

Here, both mobile communication terminals 103 have the OTP cipher key cartridges 112 with IDs=201 to 300.

In FIG. 7, the opening process (S511) of the OTP cipher key cartridge 112 with ID=201 and the cipher communication (S503) using the OTP cipher key cartridge 112 with ID=201 are the same as the sequence shown in FIG. 6.

After the communication of the communication data amount of one cartridge, the cipher key block erasing parts 410 of both mobile communication terminals 103 perform a discarding process (S521) of the OTP cipher key cartridge 112 with ID=201. Further, the cipher communication parts 408 of both mobile communication terminals 103 select ID having the least value (here, ID=202) out of the remaining OTP cipher key cartridges 112, and the opening process of the selected OTP cipher key cartridge 112 is carried out (S512). Thereafter, the cipher communication parts 408 of both mobile communication terminals 103 make the OTP encrypting/decrypting parts 409 encrypt the communication data using the OTP cipher key block 301 of the OTP cipher key cartridge 112 with ID=202 sequentially from the front bit. Then, the cipher communication parts 408 of both mobile communication terminals 103 carry out the cipher communication by transmitting/receiving the encrypted communication data (S504).

Next, when the cipher communication ends, discarding of the OTP cipher key cartridges 112 of the mobile communication terminals 103 will be explained.

Figure 8:
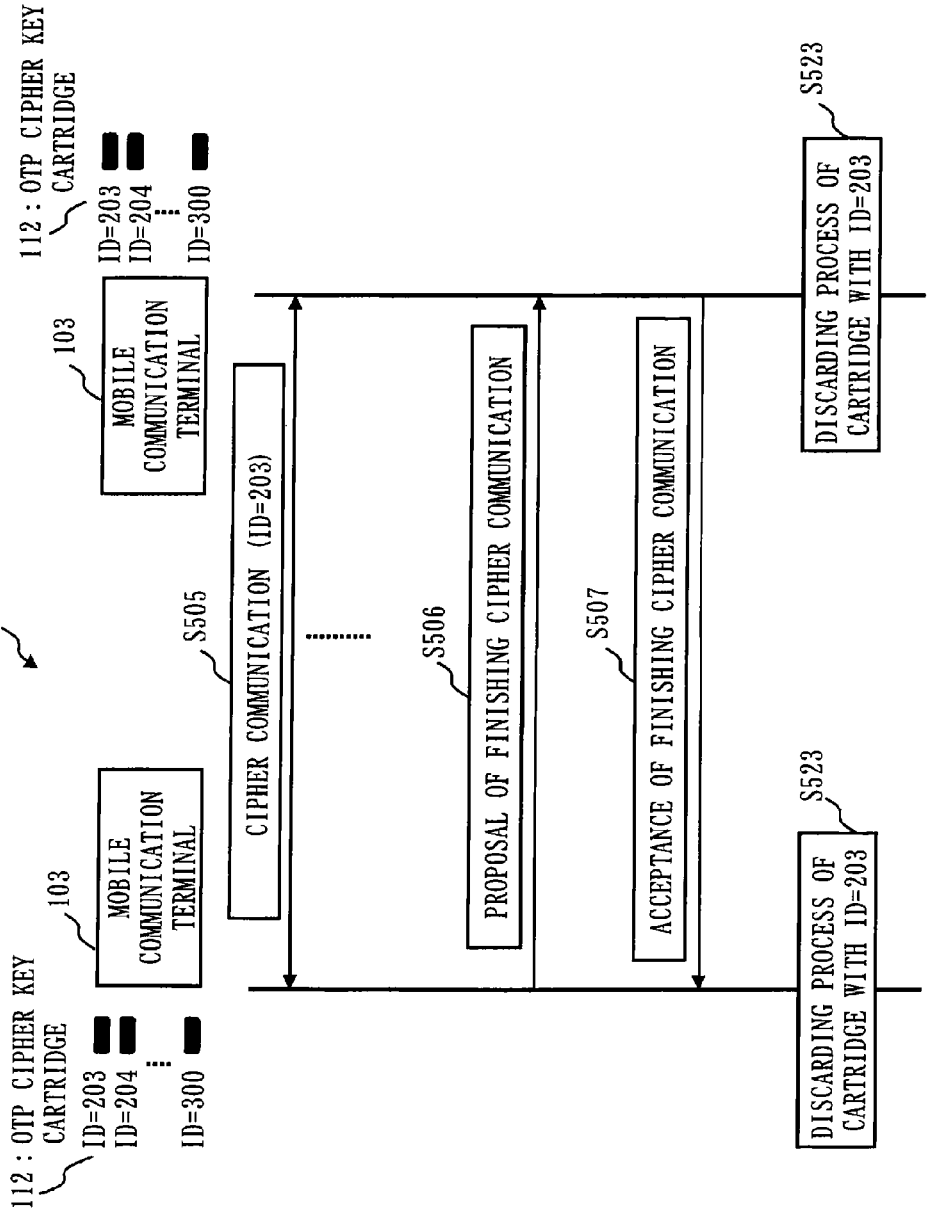
FIG. 8 is a sequence diagram when the mobile communication terminals 103 finish cipher communication.

FIG. 8 is a sequence diagram when the mobile communication terminals 103 finish cipher communication.

Here, both mobile communication terminals 103 have the OTP cipher key cartridges 112 with IDs=203 to 300, and the cipher communication is being carried out using the OTP cipher key cartridge 112 with ID=203 (S505).

The cipher communication part 408 of one of the mobile communication terminals 103 transmits a proposal of finishing the cipher communication to the other mobile communication terminal 103 (S506). Then, the cipher communication part 408 of the other mobile communication terminal 103 transmits back an acceptance of finishing the cipher communication (S507). Thereafter, the cipher key block erasing parts 410 of both mobile communication terminals 103 carry out a discarding process of the OTP cipher key cartridge 112 with ID=203 (S523).

Figure 9:
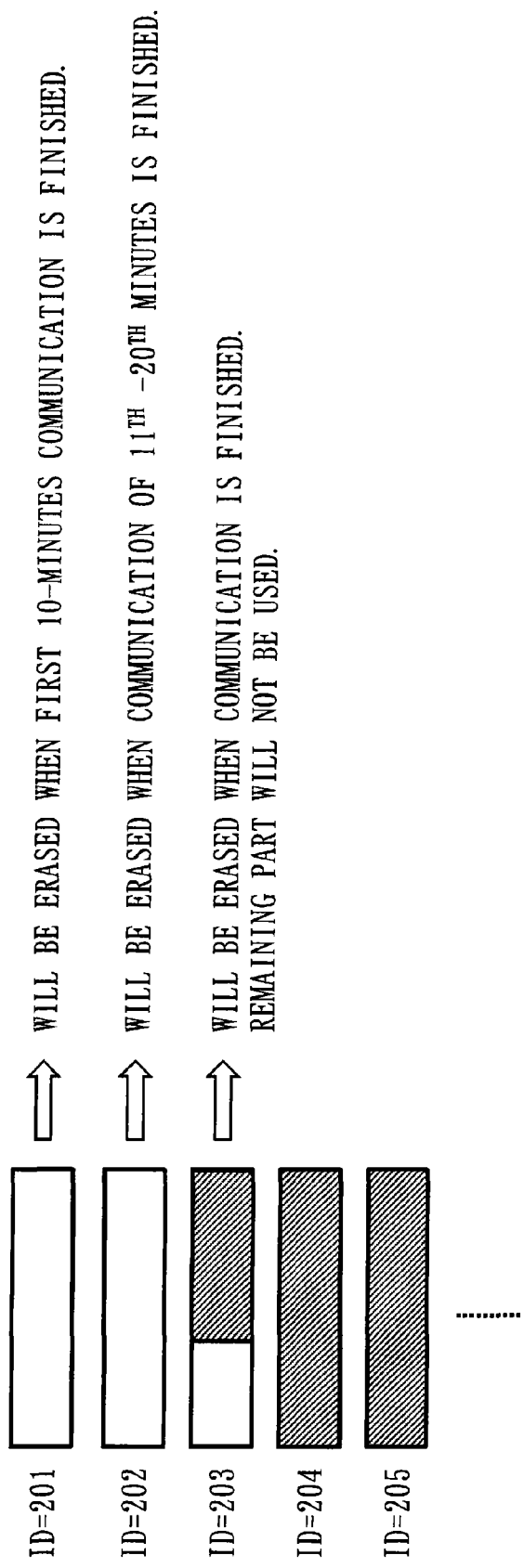
FIG. 9 explains discarding of the OTP cipher key cartridge 112.

FIG. 9 explains discarding of the OTP cipher key cartridge 112. Here, FIG. 9 shows an example when one OTP cipher key cartridge 112 is a cipher key for the OTP cipher being sufficient to encrypt call data of 10 minutes and the mobile communication terminals 103 carry out call of 24 minutes.

First, the OTP cipher key cartridge 112 with ID=201 is used for the call of the initial 10 minutes, and is erased when the initial 10-minute call is finished. Next, the OTP cipher key cartridge 112 with ID=202 is used for the call of the $11^{th}$-$20^{th}$ minutes, and is erased when the $11^{th}$-$20^{th}$ call is finished. Then, the OTP cipher key cartridge 112 with ID=203 is used for the call of the $21^{st}$-$24^{th}$ minutes, and is erased when the call is finished.

That is, although some part of the OTP cipher key cartridge 112 with ID=203 remains unused at the end of the call, that part is erased without being used. Namely, the OTP cipher key cartridge 112 being sufficient for 30-minute call is used by 24-minute call.

Hereinafter, handling of the OTP cipher key cartridge 112 will be explained by focusing on one mobile communication terminal 103.

Figure 10:
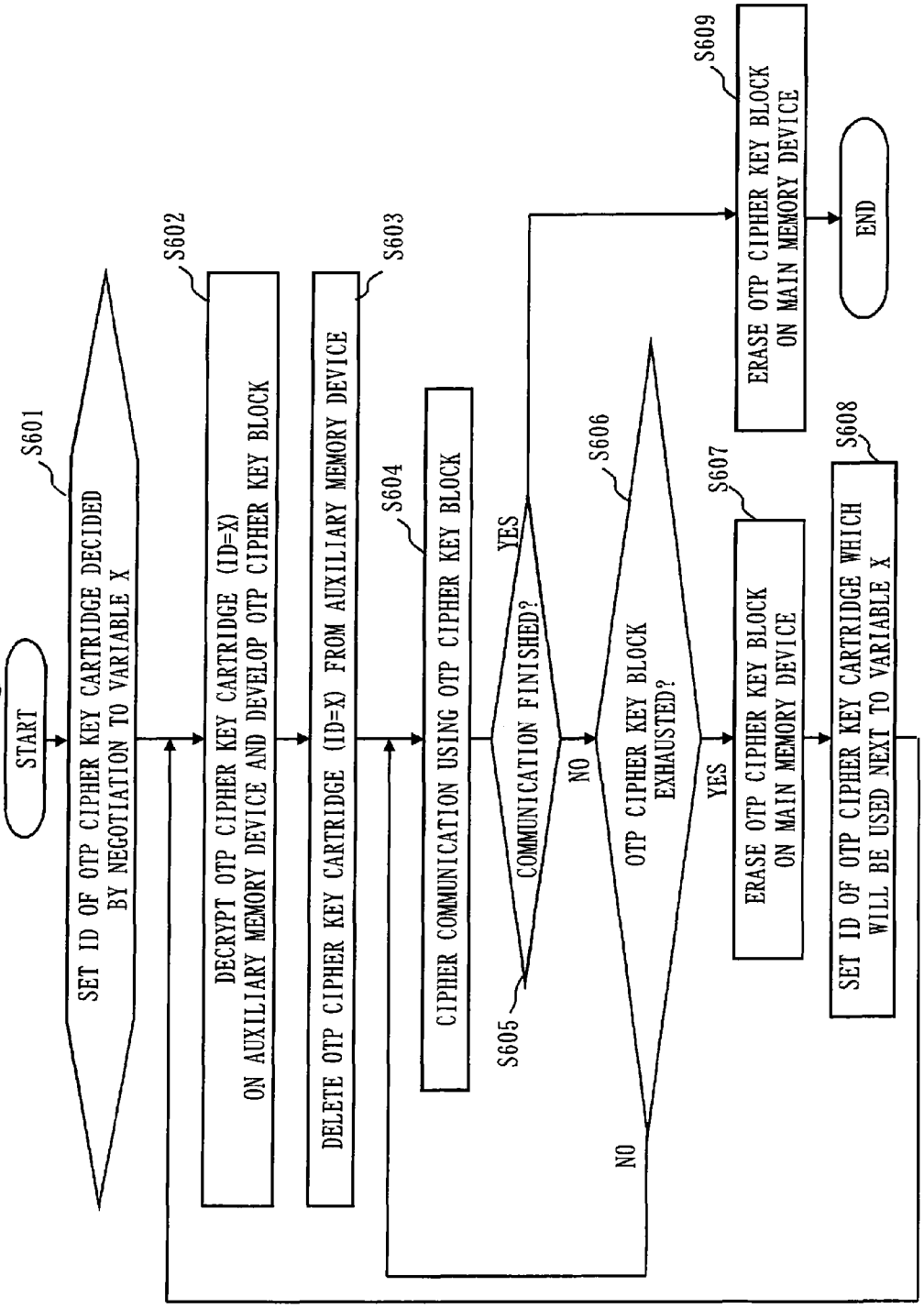
FIG. 10 is a flowchart showing handling of the OTP cipher key cartridge 112 in the mobile communication terminal 103.

FIG. 10 is a flowchart showing handling of the OTP cipher key cartridge 112 in the mobile communication terminal 103.

First, the identifying information transmission part 406 and the identifying information reception part 407 of the mobile communication terminal 103 carry out negotiation for starting communication with the mobile communication terminal 103 of the communication partner. By this operation, the value of the OTP cipher key cartridge ID 312 of the OTP cipher key cartridge 112 which is used for the first time communication is decided, and the decided value is set to the variable X and stored in the main memory device 401 (S601).

The cipher communication part 408 extracts the OTP cipher key block 301 from the OTP cipher key cartridge 112 with ID=X in the auxiliary memory device 402, and develops and stores the OTP cipher key block 301 in the main memory device 401 (S602). Further, the cipher key block erasing part 410 erases the OTP cipher key cartridge 112 with ID=X from the auxiliary memory device 402 (S603).

Subsequently, the cipher communication part 408 carries out the cipher communication using the extracted OTP cipher key block 301 (S604).

When the cipher communication is finished (YES at S605), the cipher key block erasing part 410 erases the OTP cipher key block 301 from the main memory device 401 (S609).

On the other hand, if the cipher communication is continued, and the OTP cipher key block 301 remains (NO at both S605 and S606), the cipher communication part 408 returns the process back to (S604), and carries out the cipher communication using the OTP cipher key block 301 which is being used.

Further, if the cipher communication is continued, and the OTP cipher key block 301 is exhausted (NO at S605 and YES at S606), the cipher key block erasing part 410 erases the OTP cipher key block 301 from the main memory device 401 (S607). Subsequently, the cipher communication part 408 sets the value of the OTP cipher key cartridge ID 312 of the OTP cipher key cartridge 112 which will be used for the next cipher communication to the variable X, and returns the process back to (S602). Then, the cipher communication part 408 extracts the OTP cipher key block 301 from the new OTP cipher key cartridge 112.

Hereinafter, a method for notifying the user of the remaining amount of the OTP cipher key cartridge 112 of the mobile communication terminal 103 will be explained.

Figure 11:
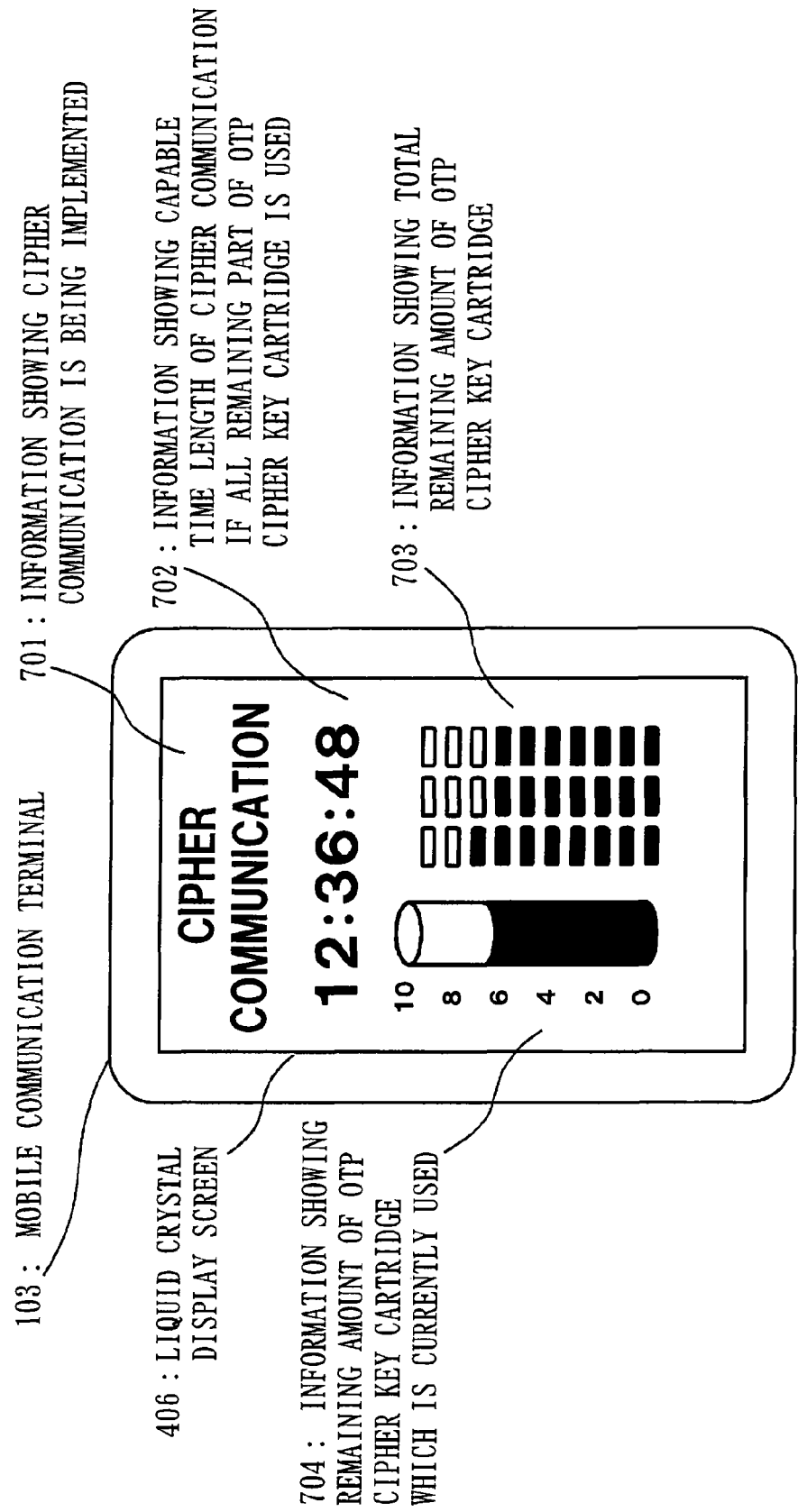
FIG. 11 shows a screen display of the mobile communication terminal 103.

FIG. 11 shows a screen display of the mobile communication terminal 103. Here, FIG. 11 shows an example when the verbal communication is done between the mobile communication terminals 103.

The remaining amount notification part 411 displays information 701 showing cipher communication is being implemented on the liquid crystal display screen 412 when the cipher communication is being carried out. Further, the remaining amount notification part 411 displays information 702 showing capable time length of cipher communication on the liquid crystal display screen 412 if all of the remaining part of the OTP cipher key cartridge 112 is used. Here, the capable time length of cipher communication can be calculated by dividing the number of remaining bits of the OTP cipher key cartridge 112 by twice of the bit rate of the communication. Further, the remaining amount notification part 411 displays information 703 showing total remaining amount of the OTP cipher key cartridge 112 on the liquid crystal display screen 412. Further, the remaining amount notification part 411 displays information 704 showing remaining amount of cipher key of the OTP cipher key cartridge 112 which is currently used on the liquid crystal display screen 412.

The remaining amount notification part 411 displays the information 701 to 704 on the liquid crystal display screen 412, thereby notifying the user of the remaining amount of the OTP cipher key cartridge 112.

Further, when the capable time length of cipher communication becomes equal to or less than a certain value or when the remaining amount of the OTP cipher key cartridge 112 is decremented by one and so on, the remaining amount notification part 411 outputs vibration using the vibrator 413 or effect sound or audio guidance using the speaker 414.

By this operation, the remaining amount notification part 411 can notify the user of the decrease of the OTP cipher key cartridge 112 even if the user cannot look at the liquid crystal display screen 412.

As discussed above, in the communication system 1 according to the first embodiment, the OTP cipher key 111 shared by the hubs using the key sharing system 101 is converted to the OTP cipher key cartridge 112 and transferred to the mobile communication terminal 103. Then, the mobile communication terminal 103 retrieves the OTP cipher key cartridge 112 to carry out cipher communication using the OTP cipher key cartridge 112 with another mobile communication terminal 103. By the above operation, the cipher communication using the OTP cipher system is implemented between the mobile communication terminals 103.

In particular, in the communication system 1 according to the first embodiment, information of the OTP cipher key cartridge IDs 312 included in the OTP cipher key cartridges 112 are exchanged with each other at the start of the cipher communication. Therefore, even if the OTP cipher key cartridges 112 transferred to the mobile communication terminals 103 do not match completely, the cipher communication can be implemented by adjusting which of the OTP cipher key cartridges 112 should be used between the mobile communication terminals 103.

Here, when the key is shared by the quantum cipher key distribution technique, it is said that the distance between the key sharing devices 105 in the key sharing system 101 is limited to around 50 to 100 kilometers. Therefore, if the communication terminal is a fixed terminal, the cipher communication using the OTP cipher is limited to the communication terminals within a range of around 50 to 100 kilometers. However, in the communication system 1 according to the first embodiment, the cipher communication using the OTP cipher system can be implemented between the mobile communication terminals 103, and thus the limitation of the distance is eliminated.

Further, in the communication system 1 according to the first embodiment, the used OTP cipher key cartridge 112 is erased immediately when it becomes unnecessary. Therefore, it is possible to prevent decrypting the contents of the past cipher communication by removing the OTP cipher key cartridge 112 from the mobile communication terminal 103.

In particular, at the time when the OTP cipher key cartridge 112 is opened and developed in the main memory device 401, the OTP cipher key cartridge 112 is erased from the auxiliary memory device 402. The main memory device 401 is capable of retaining data only while electric power is supplied to the mobile communication terminal 103; the data cannot be retained when electric power is not supplied. Therefore, if the electric power to the mobile communication terminal 103 is turned off after transmitting the encrypted communication data and before erasing the OTP cipher key cartridge 112, the OTP cipher key cartridge 112 developed is automatically erased from the main memory device 401. Accordingly, even if the above case happens, it is possible to prevent decrypting the contents of the past cipher communication by removing the OTP cipher key from the mobile communication terminal 103.

Further, in the communication system 1 according to the first embodiment, various remaining amount and their variation are notified through the liquid crystal display screen 412, the vibrator 413, and the speaker 414 of the mobile communication terminal 103. By this notification, the user can know the decrease of the OTP cipher key cartridges 112 and the remaining of the capable time length of cipher communication.

The hardware configuration of the mobile communication terminal 103 of the above embodiment will be explained.

FIG. 12 shows an example of hardware configuration of the mobile communication terminal 103.

As shown in FIG. 12, the mobile communication terminal 103 is provided with a CPU 911 (also referred to as a Central Processing Unit, central processing device, processing device, computation device, microprocessor, microcomputer, or processor) which executes programs. The CPU 911 is connected to a ROM 913, a RAM 914 (an example of the main memory device 401), a liquid crystal display screen 412, a keyboard 902 (K/B), a vibrator 413, a speaker 414, a microphone 415, a wireless communication board 915 (an example of the wireless communication part 416), a wired communication board 916 (an example of the wired communication part 417), a magnetic disk device 920 (an example of the auxiliary memory device 402) via a bus 912, and controls these hardware devices. In place of the magnetic disk device 920, a storage device such as an optical disk device or memory card read/write device may be employed. The magnetic disk device 920 is connected via a predetermined fixed disk interface.

The magnetic disk device 920, the ROM 913, or the like stores an operating system 921 (OS), a window system 922, programs 923, and files 924. The CPU 911, the operating system 921, and the window system 922 execute each program of the programs 923.

The programs 923 include software and programs that execute the functions described as the "cipher key cartridge reception part 404", the "block decrypting part 405", the "identifying information transmission part 406", the "identifying information reception part 407", the "cipher communication part 408", the "OTP encrypting/decrypting part 409", the "cipher key block erasing part 410", the "remaining amount notification part 411" and the like in the above description; and other programs. The programs are read and executed by the CPU 911.

The files 924 store information, data, signal values, variable values, and parameters to be stored in the "OTP cipher key cartridge 112", the "OTP cipher key block 301", the "device key 113" and the like in the above explanation as the entries of a "database". The "database" is stored in a recording medium such as a disk or memory. The information, data, signal values, variable values, and parameters stored in a storage medium such as a disk or memory are read out to a main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or a buffer memory during the operations of the CPU 911 including extraction, search, look-up, comparison, computation, calculation, process, output, print, and display.

Here, as with the mobile communication terminal 103, the cipher key transfer device 102 is provided with a CPU 911 which executes programs. The CPU 911 is connected to a ROM 913, a RAM 914 (an example of the main memory device 201), an LCD 901, a keyboard 902 (K/B), a communication board 915, a magnetic disk device 920 (an example of the auxiliary memory device 202) via a bus 912, and controls these hardware devices.

The magnetic disk device 920, the ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "cipher key acquisition part 204", the "cipher key cartridge generation part 205", the "block encrypting part 206", the "cipher key cartridge transfer part 207", and the like in the above explanation; and other programs.

The files 924 store information, data, signal values, variable values, and parameters of the "OTP cipher key 111", the "OTP cipher key cartridge 112", the "device key 113", and the like in the above explanation, as the entries of a "database".

Further, the arrows in the flowcharts in the above explanation mainly represent input/output of data and signals. The data and signal values are stored in the memory of the RAM 914, the recording medium such as an optical disk, or in an IC chip. The data and signals are transmitted online via a transmission medium such as the bus 912, signal lines, or cables; or electric waves.

Further, a "part" in the above explanation may be a "circuit", "device", "equipment", "means" or "function"; or a "step", "procedure", or "process". A "device" or a "terminal" may be a "circuit", "equipment", "means", or "function"; or a "step", "procedure", or "process". Namely, a "part" may be realized as firmware stored in the ROM 913. Alternatively, a "part" may be implemented by only software; by only hardware such as an element, a device, a substrate, or a wiring line; by a combination of software and hardware; or furthermore by a combination of software, hardware, and firmware. The firmware and software are stored, as programs, in the recording medium such as the ROM 913. The program is read by the CPU 911 and executed by the CPU 911. Namely, the program causes the computer or the like to function as a "part" described above. Alternatively, the program causes the computer or the like to execute the procedure and method of the "part" described above.

REFERENCE SIGNS LIST

1: communication system; 101: key sharing system; 102: cipher key transfer device; 103: mobile communication terminal; 104: network; 105: key sharing device; 106: optical fiber link; 111: OTP cipher key; 112: OTP cipher key cartridge; 113: device key; 201: main memory device; 202: auxiliary memory device; 203: device key management part; 204: cipher key acquisition part; 205: cipher key cartridge generation part; 206: block encrypting part; 207: cipher key cartridge transfer part; 208: interface part; 209: wired communication part; 301: OTP cipher key block; 302: device key ID; 303: encrypting parameter; 311: encrypted OTP cipher key block; 312: OTP cipher key cartridge ID; 313: terminal ID (#1); 314: terminal ID (#2); 401: main memory device; 402: auxiliary memory device; 403: device key management part; 404: cipher key cartridge reception part; 405: block decrypting part; 406: identifying information transmission part; 407: identifying information reception part: 408: cipher communication part; 409: OTP encrypting/decrypting part; 410: cipher key block erasing part; 411: remaining amount notification part; 412: liquid crystal display screen; 413: vibrator; 414: speaker; 415: microphone; 416: wireless communication part; and 417: wired communication part.

The invention claimed is:
1. A communication terminal comprising:
a memory coupled to a processor;
a cipher key block storage which stores a cipher key for one-time pad cipher as a plurality of cipher key blocks generated by dividing the cipher key with a predetermined number of bits;
an identifying information transmitter which transmits first identifying information, including a cipher key cartridge, that specifies the plurality of cipher key blocks stored by the cipher key block storage to a partner's terminal of communication, wherein the cipher key cartridge includes the plurality of cipher key blocks in encrypted form;
an identifying information receiver which receives from the partner's terminal second identifying information that specifies only cipher key blocks included in cipher key blocks retained by the partner's terminal among the plurality of cipher key blocks specified by the first identifying information transmitted by the identifying information transmitter; and
a cipher communication logic which copies the cipher key blocks specified by the second identifying information received by the identifying information receiver from the cipher key block storage to a volatile memory device, opens the cipher key blocks specified by the second identifying information in the volatile memory device, simultaneously to opening the cipher key blocks specified by the second identifying information in the volatile memory device, erases the cipher key blocks specified by the second identifying information from the cipher key block storage, and performs cipher communication with the partner's terminal by the one-time pad cipher using the cipher key blocks copied to the volatile memory device, wherein the cipher communication is performed using bits of each of the plurality cipher key blocks of the cipher key cartridge sequentially and each of the cipher key block and capable time length of the cipher communication is calculated by dividing number of remaining bits of the cipher key cartridge by twice of bit rate of a communication; and
the communication terminal further comprising a hardware cipher key block erasing part which first erases the cipher key block of which all bits have been used by the cipher communication logic, wherein the cipher key block erasing part further erases the cipher key block which has been used for the cipher communication by the cipher communication logic when communication with the partner's terminal is finished even if there remain unused bits in the cipher key block which has been used for the cipher communication by the cipher communication logic.

2. The communication terminal according to claim 1, wherein the cipher communication logic, when a plurality of cipher key blocks are specified by the second identifying information, selects either one of the cipher key blocks by a method which has been previously shared with the partner's terminal.

3. The communication terminal according to claim 2, wherein the cipher communication logic performs cipher communication using bits of a cipher key block sequentially in a predetermined order, and when all the bits of the cipher key block have been used, performs cipher communication using another cipher key block specified by the second identifying information.

4. The communication terminal according to claim 1, wherein the cipher key block storage is a non-volatile memory device.

5. The communication terminal according to claim 1, further comprising a remaining amount notification part which notifies a user of a number of remaining blocks of the cipher key blocks.

6. The communication terminal according to claim 5, wherein the cipher communication logic performs the cipher communication using the bits of a cipher key block sequentially in the predetermined order, and when all bits of the cipher key block have been used, performs the cipher communication using another cipher key block specified by the second identifying information, and wherein the remaining amount notification part notifies the user that the cipher key block used for the cipher communication by the cipher communication logic has been changed.

7. The communication terminal according to claim 1, wherein the cipher communication logic opens the cipher key blocks specified by the second identifying information in the volatile memory device by confirming information stored in the cipher key blocks and decrypting an encrypted portion of the cipher key blocks.

8. A communication system comprising:
a first communication terminal and a second communication terminal, wherein the first communication terminal comprises:
a first cipher key block storage which stores a cipher key for one-time pad cipher as a plurality of cipher key blocks generated by dividing the cipher key with a predetermined number of bits; and
a first identifying information transmitter which transmits first identifying information, including a cipher key cartridge, that specifies the plurality of cipher key blocks stored by the first cipher key block storage to the second communication terminal, wherein the cipher key cartridge includes the plurality of cipher key blocks in encrypted form,
wherein the second communication terminal comprises:
a second cipher key block storage which stores a cipher key for one-time pad cipher as a plurality of cipher key blocks generated by dividing the cipher key with a predetermined number of bits; and
a second identifying information transmitter which transmits second identifying information that specifies only cipher key blocks included in the plurality of cipher key blocks stored by the second cipher key block storage out of the plurality of cipher key blocks specified by the identifying information transmitted by the first identifying information transmitter to the first communication terminal, and
wherein the first communication terminal further comprises:
a first cipher communication logic which copies the cipher key blocks specified by the second identifying information transmitted by the second identifying information transmitter from the first cipher key block storage to a volatile memory device, opens the cipher key blocks specified by the second identifying information in the volatile memory device, simultaneously to opening the cipher key blocks specified by the second identifying information in the volatile memory device, erases the cipher key blocks specified by the second identifying information from the first cipher key block storage, and performs cipher communication with the second communication terminal by the one-time pad cipher using the cipher key blocks copied to the volatile memory device; and
the second communication terminal further comprises:
a second cipher communication logic which copies the cipher key blocks specified by the second identifying information transmitted by the second identifying information transmitter from the second cipher key block storage to a volatile memory device, opens the cipher key blocks specified by the second identifying information in the volatile memory device, simultaneously to opening the cipher key blocks specified by the second identifying information in the volatile memory device, erases the cipher key blocks specified by the second identifying information from the second cipher key block storage, and performs cipher communication with the first communication terminal by the one-time pad cipher using the cipher key blocks copied to the volatile memory device, wherein the cipher communication is performed using bits of each of the plurality cipher key blocks of the cipher key cartridge sequentially and each of the cipher key block and capable time length of the cipher communication is calculated by dividing number of remaining bits of the cipher key cartridge by twice of bit rate of a communication; and
the first communication terminal further comprising a hardware cipher key block erasing part which first erases the cipher key block of which all bits have been used by the first cipher communication logic, wherein the cipher key block erasing part further erases the cipher key block which has been used for the cipher communication by the first cipher communication logic when communication with the second communication terminal is finished even if there remain unused bits in the cipher key block which has been used for the cipher communication by the first cipher communication logic.

9. The communication system according to claim 8, wherein the first cipher communication logic opens the cipher key blocks specified by the second identifying information in the volatile memory device by confirming information stored in the cipher key blocks and decrypting an encrypted portion of the cipher key blocks.

10. A communication system comprising:
a communication terminal and a cipher key delivering device which delivers a cipher key for one-time pad cipher to the communication terminal, wherein the cipher key delivering device comprises:
a cipher key block generator which divides a cipher key for the one-time pad cipher into a plurality of blocks each having a predetermined number of bits, thereby generating a plurality of cipher key blocks; and
a cipher key block transmitter which transmits the plurality of cipher key blocks generated by the cipher key block generator to the communication terminal, wherein the communication terminal comprises:
a cipher key block storage which stores the cipher key block transmitted by the cipher key block transmitter;
an identifying information transmitter which transmits first identifying information, including a cipher key cartridge, that specifies a plurality of cipher key blocks stored by the cipher key block storage to a partner's terminal of communication, wherein the cipher key cartridge includes the plurality of cipher key blocks in encrypted form,
an identifying information receiver which receives from the partner's terminal second identifying information that specifies only cipher key blocks included in cipher key blocks retained by the partner's terminal among the plurality of cipher key blocks specified by the identifying information transmitted by the identifying information transmitter;

and a cipher communication logic which copies the cipher key blocks specified by the second identifying information received by the identifying information receiver from the cipher key block storage to a volatile memory device, opens the cipher key blocks specified by the second identifying information in the volatile memory device, simultaneously to opening the cipher key blocks specified by the second identifying information in the volatile memory device, erases the cipher key blocks specified by the second identifying information from the cipher key block storage, and performs cipher communication with the partner's terminal by the one-time pad cipher using the cipher key blocks copied to the volatile memory device, wherein the cipher communication is performed using bits of each of the plurality cipher key blocks of the cipher key cartridge sequentially and each of the cipher key block and capable time length of the cipher communication is calculated by dividing number of remaining bits of the cipher key cartridge by twice of bit rate of a communication; and the communication terminal further comprising a hardware cipher key block erasing part which first erases the cipher key block of which all bits have been used by the cipher communication logic, wherein the cipher key block erasing part further erases the cipher key block which has been used for the cipher communication by the cipher communication logic when communication with the partner's terminal is finished even if there remain unused bits in the cipher key block which has been used for the cipher communication by the cipher communication logic.

11. The communication system according to claim 10, wherein the cipher communication logic opens the cipher key blocks specified by the second identifying information in the volatile memory device by confirming information stored in the cipher key blocks and decrypting an encrypted portion of the cipher key blocks.

12. A communication method of a communication terminal including a non-volatile memory device which stores a cipher key for one-time pad cipher as a plurality of cipher key blocks generated by dividing the cipher key with a predetermined number of bits, the method comprising:

transmitting first identifying information, including a cipher key cartridge, that specifies the plurality of cipher key blocks stored in the non-volatile memory device to a partner's terminal of communication, wherein the cipher key cartridge includes the plurality of cipher key blocks in encrypted form;

receiving second identifying information that specifies only cipher key blocks included in cipher key blocks retained by the partner's terminal among the plurality of cipher key blocks specified by the first identifying information;

copying the cipher key blocks specified by the second identifying information from the non-volatile memory device to a volatile memory device;

opening the cipher key blocks specified by the second identifying information in the volatile memory device;

simultaneously to the opening, erasing the cipher key blocks specified by the second identifying information from the non-volatile memory device as an original to be copied; and performing cipher communication with the partner's terminal by the one-time pad cipher using the cipher key blocks copied to the volatile memory device, wherein the cipher communication is performed using bits of each of the plurality cipher key blocks of the cipher key cartridge sequentially and each of the cipher key block and capable time length of the cipher communication is calculated by dividing number of remaining bits of the cipher key cartridge by twice of bit rate of a communication; and the communication terminal further comprising a hardware cipher key block erasing part which first erases the cipher key block of which all bits have been used by the cipher communication logic, wherein the cipher key block erasing part further erases the cipher key block which has been used for the cipher communication by the cipher communication logic when communication with the partner's terminal is finished even if there remain unused bits in the cipher key block which has been used for the cipher communication by the cipher communication logic.

13. The communication method according to claim 12, wherein the opening further comprises:

confirming information stored in the cipher key blocks; and decrypting an encrypted portion of the cipher key blocks.

14. A non-transitory computer readable medium storing a communication program of a communication terminal including a non-volatile memory device which stores a cipher key for one-time pad cipher as a plurality of cipher key blocks generated by dividing the cipher key with a predetermined number of bits, the program causes a computer to execute:

an identifying information transmitting process of transmitting first identifying information, including a cipher key cartridge, that specifies the plurality of cipher key blocks stored in the non-volatile memory device to a partner's terminal of communication, wherein the cipher key cartridge includes the plurality of cipher key blocks in encrypted form;

an identifying information receiving process of receiving second identifying information that specifies only cipher key blocks included in cipher key blocks retained by the partner's terminal among the plurality of cipher key blocks specified by the first identifying information transmitted by the identifying information transmitting process; and a cipher communication process of copying the cipher key blocks specified by the second identifying information received by the identifying information reception process from the non-volatile memory device to a volatile memory device;

opening the cipher key blocks specified by the second identifying information in the volatile memory device;

simultaneously to the opening, erasing the cipher key blocks specified by the second identifying information from the volatile memory device; and performing cipher communication with the partner's terminal by the one-time pad cipher using the cipher key blocks copied to the volatile memory device, wherein the cipher communication is performed using bits of each of the plurality cipher key blocks of the cipher key cartridge sequentially and each of the cipher key block and capable time length of the cipher communication is calculated by dividing number of remaining bits of the cipher key cartridge by twice of bit rate of a communication; and the communication terminal further comprising a hardware cipher key block erasing part which first erases the cipher key block of which all bits have been used by the cipher communication logic, wherein the cipher key block erasing part further erases the cipher key block which has been used for the cipher communication by the cipher communication logic when communication with the partner's terminal is finished even if there remain unused bits in the cipher key block which has been used for the cipher communication by the cipher communication logic.

15. The non-transitory computer readable medium according to claim 14, wherein the program further causes the computer to execute:

confirming information stored in the cipher key blocks; and
decrypting an encrypted portion of the cipher key blocks.

* * * * *